July 16, 1929.  L. E. PERRY  1,721,086
FLOCK CUTTER
Filed Oct. 11, 1926  2 Sheets-Sheet 1

Inventor:
Louis E. Perry.
by
Edward A. Hathaway
Attorney.

July 16, 1929.  L. E. PERRY  1,721,086
FLOCK CUTTER
Filed Oct. 11, 1926  2 Sheets-Sheet 2

Inventor:
Louis E. Perry.
by
Attorney.

Patented July 16, 1929.

1,721,086

UNITED STATES PATENT OFFICE.

LOUIS EDWARD PERRY, OF CLAREMONT, NEW HAMPSHIRE, ASSIGNOR TO CLAREMONT WASTE MANUFACTURING COMPANY, A CORPORATION OF NEW HAMPSHIRE.

FLOCK CUTTER.

Application filed October 11, 1926. Serial No. 140,828.

This invention relates to flock cutting machines and more particularly to a feeding mechanism therefor.

An object of my invention is to improve that type of feeding mechanism disclosed in the patent of William J. Decoteau, No. 1,634,741. More specifically the object is to provide improved means for permitting a very fast rate of feed while retaining the uniform feeding and cutting qualities of the invention disclosed in said patent. My improved means also insures a feed which is positive at any speed.

Figure 1:
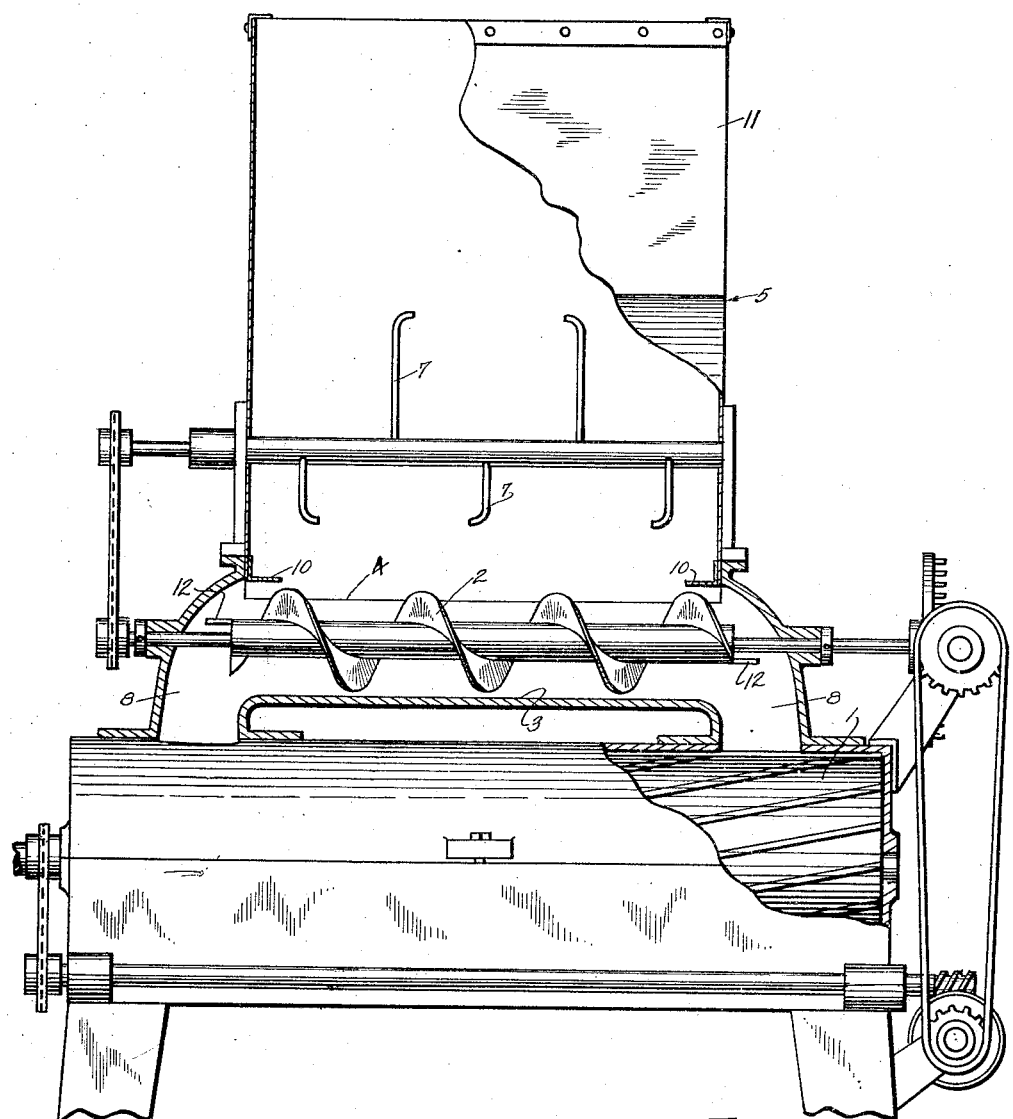
Figure 2:
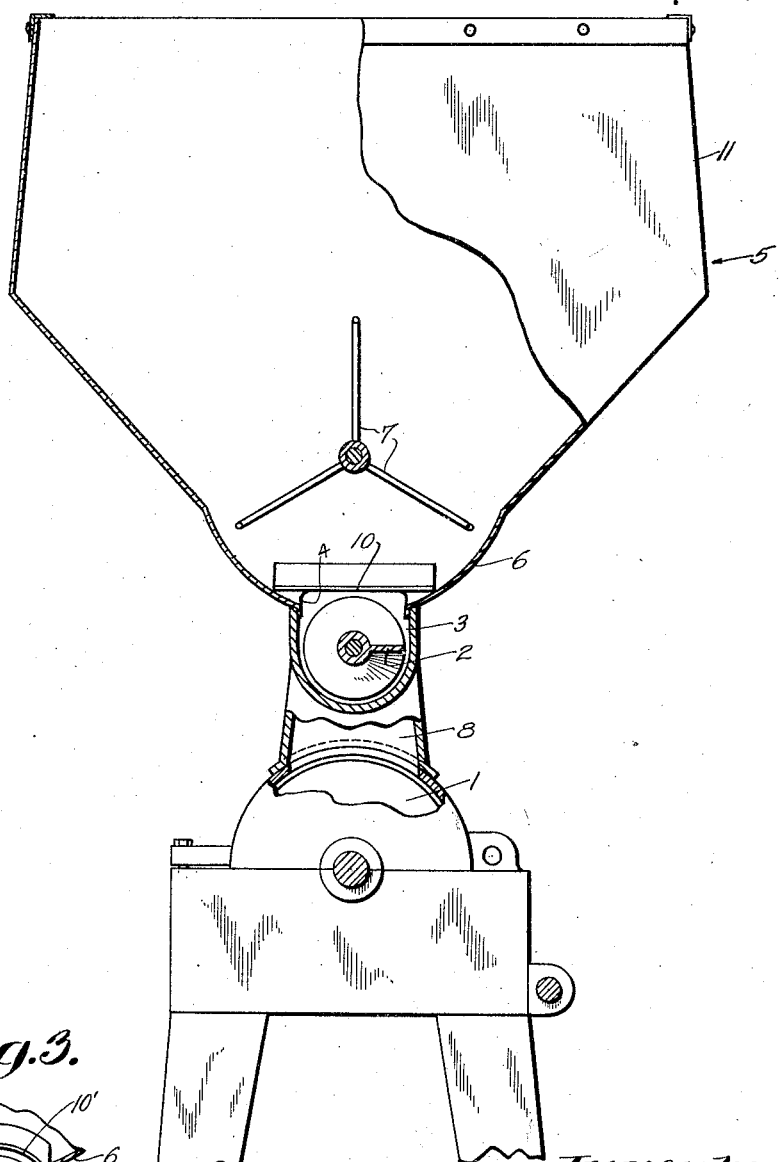
Figure 3:
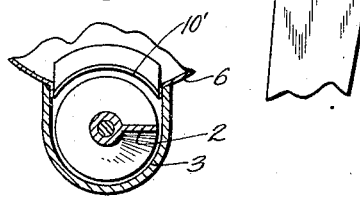

Other objects and advantages will be apparent from the following description of the accompanying drawings, in which Fig. 1 is a partial sectional view of a flock cutter showing my improved feed thereon;

Fig. 2 is a fragmentary transverse section of the flock cutter showing the relation between the improved hopper and agitator, and Fig. 3 is a modification of the improved passage.

The flock cutter disclosed in said patent comprises briefly a usual type of reversible cutter 1 rotatably driven by any suitable means and having a feeding mechanism including a screw conveyor 2 disposed at its lower side close to the curved bottom of a passage 3 while a considerable area of the upper side of the screw is adjacent an extended opening 4 communicating with a hopper 5. This hopper has arcuate lower portions 6 over which sweep the arms 7 of an agitator. Leading to the cutter from each end of the screw passage are flaring discharge passages 8. The cutter, screw and agitator have common driving connections therebetween so that whenever the cutter is reversed the screw will also be reversed thereby discharging flock to only one end or the other of the cutter automatically in accordance with the direction of cutter rotation.

My invention resides in improving the operative relation between the passages, screw, hopper and agitator so that an even better feed may be had than in the case of said copending application and particularly to render the machine more perfect for fast and positive cutting. It was found that by adding the small overhanging lips 10 so that a small amount of the screw ends is disposed in a relatively closed passage that the machine efficiency was materially increased. It is to be noted that even though the screw ends are covered there is still a very large area of the upper surface of the screw exposed directly to the flock in hopper 5 as through opening 4. The lips 10 can be transversely straight as shown in Fig. 2 or curved as shown at 10' in Fig. 3. A single prong 12 is carried by each end of the screw for the use of only a single prong has been found to be very effective in preventing flock from bridging over the screw shaft.

In order to have a series of fast cutting machines taken care of by a minimum number of workmen it was found necessary to provide a hopper having considerable capacity but the difficulty encountered was that the screw demanded a relatively narrow transverse opening compared to the size of a suitable hopper so that the first attempts were to provide a hopper flaring outwardly from the relatively narrow screw opening. The difficulty here involved was that the flock would not fall by gravity nor would it come into positive enough contact with the screw to permit the latter to function. Hence the agitator was found to be useful not only to insure that the flock would feed but also to bring the flock into such positive relation to the screw that the latter could function properly. However, only the flock within range of the agitator would be fed from the hopper and there would be created a dead line just above the agitator and the flock would not feed below this line. The flock would bridge across the outwardly flaring hopper walls and to overcome this and allow the flock to feed to the agitator without the use of further mechanical contrivances and to maintain the hopper capacity I bent the hopper walls inwardly as at 11 above the dead line, finding that any tendency to bridge was overcome for the flock after a certain period would break in the center and fall into the path of the agitator. The agitator could thereafter carry the flock to the relatively narrow screw opening. Thus by my arrangement I am able to have a very large hopper capacity and still use a relatively narrow passage through which to discharge the flock. It will be seen that the inwardly extending hopper walls would be of no avail in connection with the flaring hopper wall portions and the narrow opening unless the agitator was interposed therebetween to bring them into proper cooperation. Hence there is a definite interdependence between these elements which goes to make up a highly efficient machine.

A further improvement is the provision of only a single prong 12 on each end of the screw. Thus during rotation of the screw the single prong on each end has been found to very efficiently keep the flock from bridging around the shaft.

I claim:

1. In a flock cutter, a feeding mechanism, including means forming a longitudinal passage terminating at one end in a radially enclosed outlet, a discharge passage leading from said outlet and constituting a closed and relatively smooth continuation of said longitudinal passage, said longitudinal passage having an extended longitudinal inlet opening, and a feed screw disposed in said passage and extending within said radially enclosed portion.

2. In a flock cutter, a feeding mechanism including a feed screw adapted to discharge flock in only one direction during uni-directional screw rotation, and means forming a passage within which said screw is disposed, said passage having an inlet opening extending along the side of said screw, a lip overhanging the end thereof thereby to radially enclose said end, and means forming a discharge passage leading from said screw passage to the cutter.

3. In a flock cutter, a feeding mechanism including a screw, means forming a passage therefor having an extended relatively narrow inlet opening disposed a substantial distance along the side of said screw while the ends of said passage are radially enclosed for a very small distance in comparison to the length of said opening, a hopper having an outlet communicating with said passage through said inlet opening, and a combined agitator and feeding element disposed in said hopper and adapted to aid in feeding flock through said relatively narrow inlet opening.

4. In a flock cutter, a feeding mechanism therefor including a mechanical conveyor and a hopper having a bulged central portion extending substantially parallel to said conveyor and said hopper having an outlet opening in the smaller portion thereof, the hopper walls adjacent said opening being curved, and means cooperating with said curved wall portions to feed flock through said outlet opening.

5. In a flock cutter, a feeding mechanism including means forming a longitudinal passage terminating at one end in a radially enclosed outlet, a discharge passage leading from said outlet and forming a closed continuation of said longitudinal passage, said longitudinal passage having an extended longitudinal inlet opening, a mechanical conveyor disposed in said longitudinal passage and adapted to be moved continuously in one direction and extending within said radially enclosed outlet, a hopper having an extended outlet opening communicating with said passage through its inlet opening and having walls extending outwardly and then inwardly with respect to a vertical plane, and an agitator disposed within said hopper adapted to sweep adjacent the lower walls of said hopper and said opening.

6. In a flock cutter, a feeding mechanism including a hopper having a relatively narrow longitudinally disposed outlet opening, the walls of said hopper being curved upwardly from said opening, thence flaring outwardly and then inwardly, a rotatable agitator disposed within said hopper and having arms sweeping through arcuate paths, the center of which substantially coincides with the center of curvature of the curved portions of said hopper walls, the center of rotation of said agitator also being disposed below the point at which the hopper walls extend inward, and means forming a conveyor passage leading from said opening to the cutter.

LOUIS EDWARD PERRY.